United States Patent [19]

Mueller et al.

[11] Patent Number: 4,722,502
[45] Date of Patent: Feb. 2, 1988

[54] ADJUSTABLE SUPPORT SYSTEM

[75] Inventors: Wolfgang Mueller; Arthur T. Nagare, both of Erie, Pa.

[73] Assignee: American Sterilizer Company, Erie, Pa.

[21] Appl. No.: 783,304

[22] Filed: Oct. 2, 1985

[51] Int. Cl.$^4$ ............................................. F16C 11/00
[52] U.S. Cl. ..................................... 248/284; 403/91; 403/146; 403/129; 362/427; 188/70 R
[58] Field of Search ............... 248/284, 291, 479, 483, 248/485, 486; 403/91, 129, 131, 133, 146, 147, 148; 362/209, 427, 804; 285/267, 270, 282; 188/67, 70 R, 265

[56] References Cited

U.S. PATENT DOCUMENTS 3,409,265 11/1968 Wichers et al. ..................... 248/483

Primary Examiner—Cornelius J. Husar
Assistant Examiner—Anthony Knight
Attorney, Agent, or Firm—Kirkpatrick & Lockhart

[57] ABSTRACT

Apparatus is provided for adjustably supporting an object, such as a surgical light, between two points on a yoke-type frame. A housing having a cylindrical cavity and a threaded axial bore therethrough is secured to one of two hubs provided on the legs of the yoke. An adjustment screw having a face plate passes through the aperture. Wave washers and a spherical washer having a spherically concave friction surface are provided within the housing's cavity. A shaft is supported within the housing by a spherical bearing and terminates in a nut having a spherically convex friction surface. A keyway and recessed area on the shaft serve to secure the light to the shaft. The hub on the other leg is provided with a spherical bearing which supports a second shaft. The second shaft has a keyway and a recessed area which are engaged by a key and adjusting screw on a second mounting bracket in the opposite side of the light. As such, the axial force generated by the adjusting screw creates a force on, respectively, the face plate, wave springs and the spherical washer. Such axial force creates a frictional force between the mating surfaces of the spherical washer and nut thereby adjustably retaining the light.

16 Claims, 6 Drawing Figures

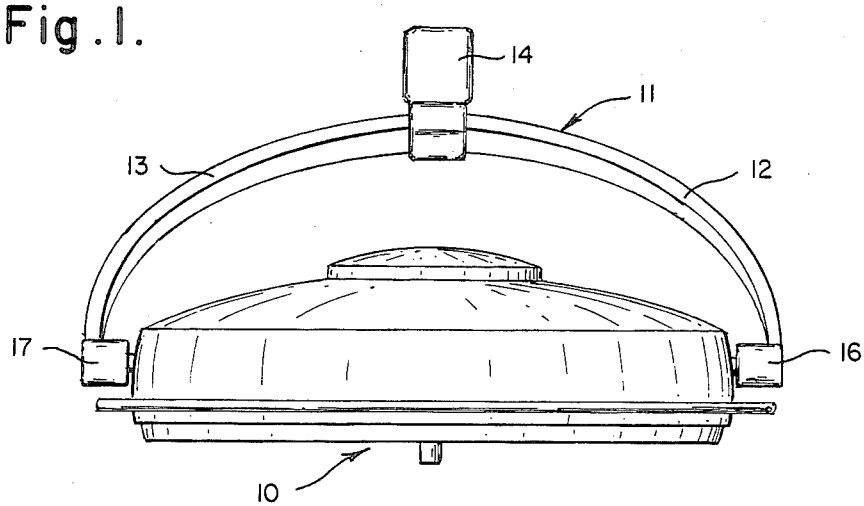
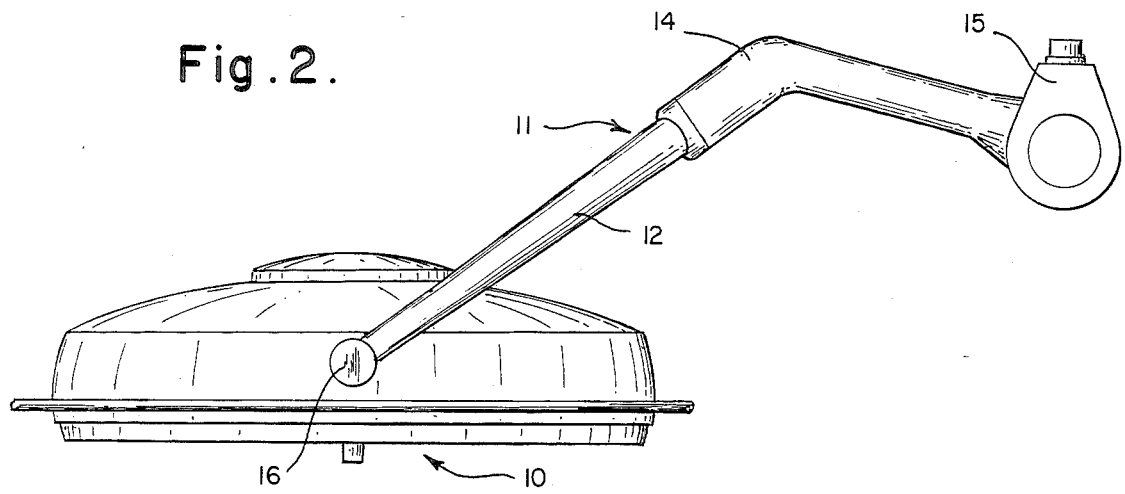

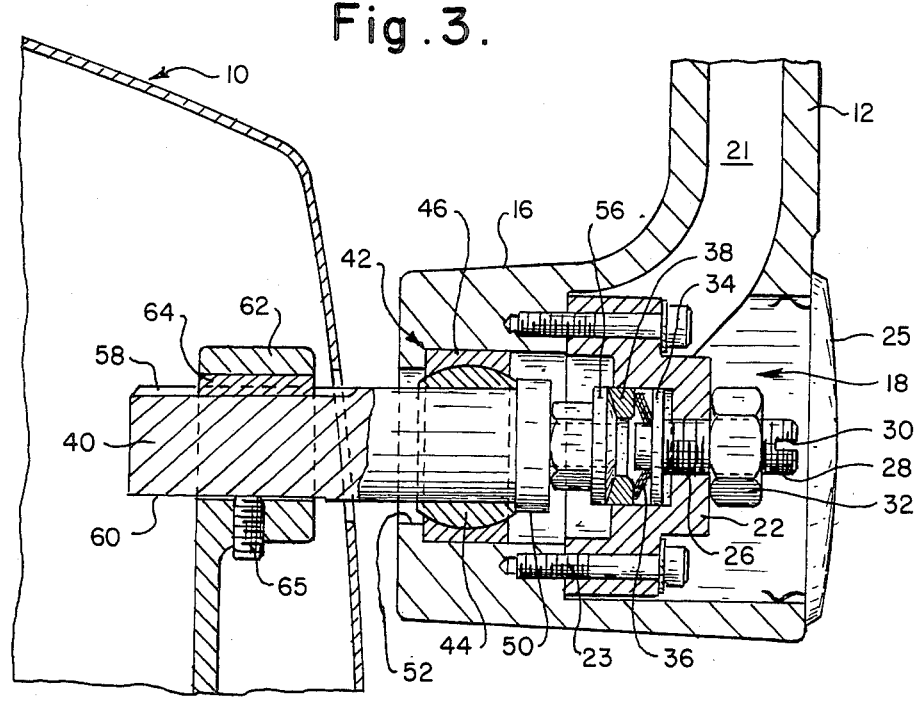
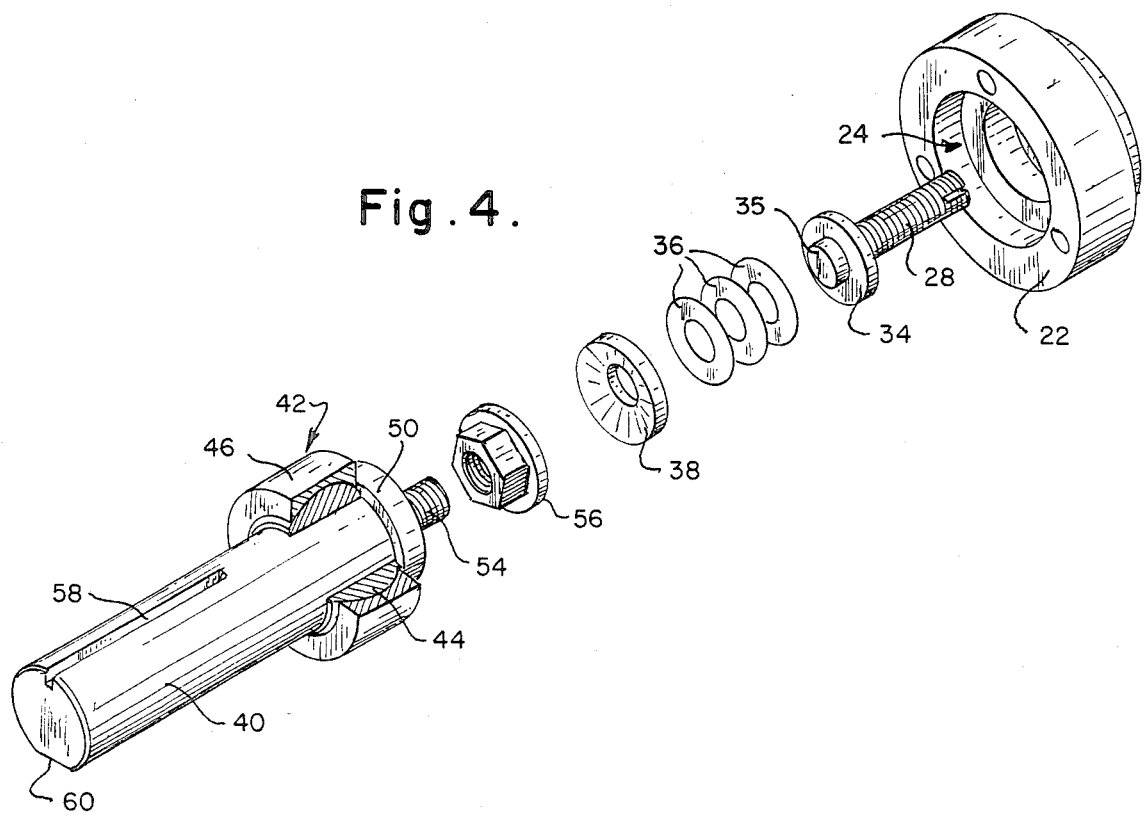

ADJUSTABLE SUPPORT SYSTEM

BACKGROUND OF THE INVENTION

1. Field of the Invention

The present invention relates to apparatus for movably supporting an object and, in particular, to apparatus for adjustably supporting an imbalanced object between two points which are not in complete alignment.

2. Description of the Prior Art

In a host of environments throughout modern society it has been proven expedient to support an object between two points. Frequently, it is advantageous to adjustably support an object by suspending it from two points which may be disposed on a frame in the form of a yoke. An example of an article employing such a general construction is a lamp which is pivotally supported by a yoke-type frame member. In particular, a surgical lamp used in various medical environments may employ such a configuration.

In such an application, it is desirable to allow the lamp to be pivotable, yet retainable in a modified position, within such a support to allow the directing of the light generated by the lamp to the required locale. One prior art apparatus for adjustably supporting an object between two points on a yoke included a pair of shafts attached between the yoke and the object. One of such shafts included a radial drum brake disposed about the end of the shaft, which end included a means for slightly increasing the shaft's diameter thereby causing it to be engaged by the drum brake. An inherent limitation in such a system was the fact that if the axis of rotation of the object was not exactly that of the shaft, the shaft would ride unevenly on the drum brake thereby causing binding or inadequate braking of the object in its supports.

Another prior art apparatus for adjustably supporting an object also included twin shafts affixed between a yoke and the object. One of the shafts was provided with a friction surface perpendicular to the shaft's axis. A parallel opposing friction surface was provided in facing relation to the shaft's friction surface such that the friction created between the friction surfaces would provide adjustability and subsequent retention of the object's position. Unfortunately, as will be readily appreciated, the surfaces were required to be retained absolutely parallel to avoid binding which necessitated the provision of a straight axis of rotation through the axis of the shaft.

As such, heretofore due to the requirement of a straight axis of rotation for the lamp within its support, the points of engagement of the lamp with its support were required to be in complete alignment. Otherwise, if the axis of rotation was skewed relative to the support points, free pivoting and, hence, the directing of light to the needed spot was not possible. Clearly, therefore, if a support member is to be constructed to allow adjustment of a light, the support points must have been in complete alignment. To accomplish such a construction, the manufacturing time, skill and equipment required, and hence, the resulting apparatus cost, was high. Further, the costs associated with increased assembly and adjustment times were significant.

Another concern of the prior art relating to adjustably supporting an object related to the balancing of the object. It has heretofore been the usual feeling that the object was required to be balanced to avoid its unwanted movement after positioning. It will be readily appreciated that such required balance of a surgical lamp interfered with the efficiency of the lamp design and added to the engineering costs as well as increasing the costs of its respective parts and its overall manufacture. Also, the prior art practice of simply adding counterweights to the lamp is clearly inefficient, cost-adding and often ineffective.

The subject invention is directed toward an improved support means for an article, such as a surgical lamp, to be supported between two points which overcomes, among others, the above-described shortcomings of the prior art and which is effective to adjustably support, yet positively position, a lamp means.

SUMMARY OF THE INVENTION

In accordance with the present invention, there is provided apparatus for adjustably, yet securely, supporting an object such as a surgical light housing. The apparatus includes a yoke having two extended legs, each leg being provided with a hub area at the extreme portion thereof. In one such hub area there is provided a chamber within which is securely received a generally cup-shaped, cylindrical housing having a cylindrical cavity formed in the end thereof. The housing also includes a threaded axial bore therethrough through which passes a threaded adjusting screw having an adjusting plate secured to its leading end. Within the housing's cylindrical cavity there are provided a series of wave washers which axially bias a spherical washer having a flat surface and a concave spherical friction surface.

The concave spherical surface is configured to accept the convex friction surface of a spherical nut which is affixed to the end of a shaft. A spherical bearing is provided to be supported by the hub and, in turn, to receive and support the shaft. The shaft is provided with a keyway which receives the key of a mounting bracket internal to the light housing and with a flat recessed area which is engaged by a retaining screw on the mounting bracket.

Another hub area is disposed on the second leg of the yoke and is provided with a spherical bearing therein which supportably receives a second shaft. The second shaft may be hollow and is provided at one end with a retaining shoulder and at the other end with a keyway and a flat recessed area. The keyway is engaged by a key in the opposite side frame mounting bracket of the light housing while the recessed area is engaged by a retaining screw also provided on the mounting bracket.

In operation, the adjusting screw may be axially displaced thereby providing an axial force on the spherical washer against the force of the wave springs. Such action urges the concave friction surface of the spherical washer into further engagement with the convex friction surface of the spherical nut creating a frictional force therebetween sufficient to prevent the rotation of the shaft within the spherical bearing while the actions of the spherical bearing and of the spherical nut and washer allow the effective alignment of the shafts of each leg of the yoke. Such actions allow the ready pivoting of the object yet retain the object in position after adjustment. The spherical bearing on the opposite hub's shaft allows free pivotability without requiring axial alignment of the respective hubs.

Accordingly, the present invention provides solutions to the aforementioned problems relating to the support of imbalanced objects such as surgical lights. As this invention provides an effective means of supporting an imbalanced object effective to allow the change in orientation thereof from one position to another, the problems present in prior art support means are alleviated. In addition, as the present invention provides an uncomplicated, readily adjustable support device, the problems of previous devices such as the requirement of object balancing, weight addition, and high assembly and adjustment times are solved. Further, the straightforward design of the present invention affords an effective, inexpensive, and readily adjustable support apparatus.

These and other details, objects, and advantages of the invention will become apparent as the following description of the present preferred embodiment thereof proceeds.

BRIEF DESCRIPTION OF THE DRAWINGS

In the accompanying drawings I have shown a present preferred embodiment of the invention wherein:

FIG. 1 is a front elevation view of a surgical light apparatus employing the present invention;

FIG. 2 is a side elevation view of a surgical light apparatus employing the present invention;

FIG. 3 is a side elevation sectional view of one hub of the support apparatus provided herein;

FIG. 4 is an exploded view of certain of the components shown in FIG. 3;

DETAILED DESCRIPTION OF THE PREFERRED EMBODIMENTS

Figure 5:
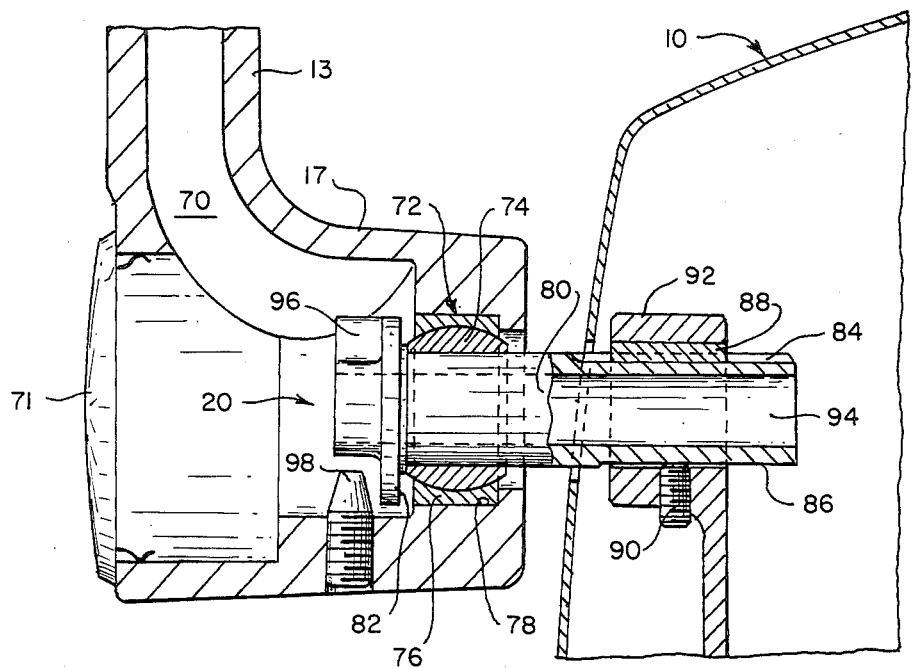
FIG. 5 is a side elevation view of the other hub of the support structure of the present invention; and, FIG. 6 is a perspective view of a portion of the support structure of the other hub of the invention.
Figure 6:
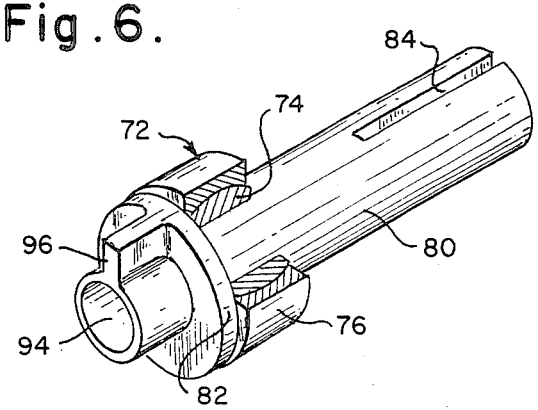

Referring now to the drawings wherein the showings are for purposes of illustrating the present preferred embodiment of the invention only and not for purposes of limiting same, the figures show an object 10, which for purposes of example only, may consist of a surgical light. Light 10 is supported by means of yoke 11 which is provided with two legs 12 and 13, respectively. Yoke 11 is attached to an arm 14 which, in turn is supported by a frame 15. Frame 15 may consist of a means for supporting light 10 from an overhead locate or by means of a wall or floor mounting or by a portable support system. Legs 12 and 13 each terminate at their free ends in hub portion 16 and 17, respectively. Hub 16 is provided with a first support apparatus 18 and hub 17 is provided with a second support apparatus 20 such that light 10 is supported by first and second support apparatuses 18 and 20, respectively.

Hub 16 of leg 12 is provided with an internal chamber 21 to which is secured a cup-shaped cylindrical housing 22 of support apparatus 18 by means of bolts 23. An end cap 25 seals chamber 21 from the environment. Housing 22 consists of a cylindrical body having an axial cylindrical cavity 24 recessed therein. Passing axially through housing 22 from cavity 24 to the trailing end of housing 22 is an axial threaded bore 26. (For purposes of this DETAILED DESCRIPTION OF THE PREFERRED EMBODIMENTS the leading end of parts will be described as that portion closest to light 10.) Threaded within threaded bore 26 is an adjusting screw 28 which includes a slot 30 in the end thereof adapted to receive a screwdriver or other adjusting means. A lock nut 32 may be provided on the extended portion of adjusting screw 28 to lock it into a desired position relative to housing 22. A face plate 34 having a raised cylindrical portion 35 is affixed to the leading end of adjusting screw 28 so as to be displaceable by means thereof within cavity 24.

Also provided within cavity 24 of housing 22 adjacent face plate 34 and surrounding cylindrical portion 35 are one or more wave springs 36 which are retained in position by raised cylinder 35 and which, when compressed, generate an axial force component along the axis of adjusting screw 28. Additionally received within cavity 24 is a spherical washer 38 having a flat trailing end face adjacent to wave springs 36 and a spherically concave leading face which is provided with a friction surface thereon. In operation, when adjusting screw 28 is displaced a sufficient amount, cylindrical portion 35 may be caused to enter the aperture through spherical washer 38 so as to restrain it in position.

In facing relation to the concave face of spherical washer 38 is a shaft 40 which passes through and is supported within hub 16 by means of annular spherical bearing 42. Spherical bearing 42 includes an inner race 44 and an outer race 46, one of which has a spherically convex or concave face while the other has a corresponding spherically concave or convex face. A shoulder 50 on the trailing end of shaft 40 engages the inner race 44 of spherical bearing 42 while a shoulder 52 on hub 16 engages its outer race 46. Inner race 44 is preferably pressed onto shaft 40 while outer race 46 is disposed between cylindrical housing 22 and shoulder 52 on hub 16 whereby the bolts 23 provide a compressive force to retain the outer race 46. Spherical bearing 42 is thus retained between shaft 40 and hub 16.

Shaft 40 is also provided with an axial threaded stud 54 extending from its trailing end to which is attached a spherical nut 56 having a spherically convex trailing face shaped in correspondence to the concave face of spherical washer 38 and also having a friction surface thereon. Preferably, the radius of curvature of the spherically concave face of spherical washer 38 is equal to that of the spherically convex face of spherical nut 56. Shaft 40 also includes a keyway 58 on the upper surface of its leading end and a flat recessed area 60 on the lower surface of its leading end.

Light 10 is secured to the leading end of shaft 40 by means of a mounting bracket 62 mounted within light 10 and having a key 64 formed therein intended to engage keyway 58 and a securing screw 65 which is configured to engage recessed surface 60.

As discussed above, hub 17 of leg 13 is provided with a second support means 20. Support means 20 is disposed, in part, within internal chamber 70 of hub 17 which is sealed from the environment by an end cap 71. In particular, a second spherical bearing 72 having an inner race 74 and an outer race 76 is press fit into a cylindrical portion 78 of hub 16. A second shaft 80 is slidably received within the inner race 74 and is retained therein by virtue of the engagement of shoulder 82 on the trailing end of shaft 80 with inner race 74. The leading end of shaft 80 includes a keyway 84 and a flat recessed surface 86 on the underside thereof. As such, key 88 and adjusting screw 90 mounted on a second internal mounting bracket 92 of light 10 cooperate with keyway 84 and recessed surface 86, respectively, to support light 10. Shaft 80 is also provided with an inner aperture 94 which may provide a conduit for wires (not shown) to enter the light 10. Additionally, a stop 96 is formed on the trailing end of shaft 80 to cooperate with a screw 98 to prevent the complete rotation of light 10 thereby avoiding the overtwisting of the electrical wires.

Following assembly of the respective elements of support apparatus 12, to operate such apparatus, adjusting screw 28 is turned by means of its slot 30 so as to generate an axial force via face plate 34 on wave springs 36. Such an axial force is operative to compress wave springs 36 and thus cause the spring load of wave springs 36 to force the concave face of spherical washer 38 into further engagement with the convex face of spherical nut 56. Upon the proper adjustment of adjusting screw 28, the friction created between the wave springs 36 and the face plate 34 of adjusting screw 28 and between the wave springs 36 and the spherical washer 38 is sufficient to prevent rotational movement of wave springs 36 and spherical washer 38. As such, all movements take place between the highly lubricated friction surfaces of the spherical washer 38 and the spherical nut 56 and the inner and outer races, 44 and 46, respectively of spherical bearing 42 which, nonetheless, maintain appropriate friction to prevent the movement of shaft 40 and, hence, light 10. The spherical washer 38 is thus transversely captive but it is free to move relative to the spherical surface of spherical nut 56. However, spherical washer 38 does not rotate due to the frictional engagement caused by wave springs 36. Thus, when shaft 40 rotates, the spherical nature of those mating surfaces prevents binding. Further, the tightening of securing screw 64 against recessed portion 60 of shaft 40 serves to lock light 10 axially therealong.

From the above, it should be appreciated that although two support apparatuses 18 and 20, respectively are provided on legs 12 and 13, respectively, due to the flexible orientation of the respective shafts 40, each support apparatus 18 and 20 may function rather independently providing independent axial pivots for each side of light 10. In addition, alignment compensation is achieved in the present system due to the combination of the spherical bearing 42 and the relationship of the spherical nut 56 and the spherical washer 38. Further, the axial load supplied by the adjusting screw 28 applies a thrust load on the spherical bearing 42, the spherical nut 56 and spherical washer 38. Due to the nature of the spherical bearing 42 and the relationship of the spherical nut 56 and spherical washer 38 any axial misalignment will not cause the binding thereof because the total load on the bearing surfaces of the spherical bearing 42 remains constant.

It must be appreciated that, if appropriate, the support system 18 of the present invention could be employed using only one hub thereby providing a single support axis for an object 10.

It will be understood that various changes in the details, materials and arrangements of parts which have been herein described and illustrated in order to explain the nature of the invention may be made by those skilled in the art within the principle and scope of the invention as expressed in the appended claims.

What is claimed is:

1. Apparatus for pivotally adjustably supporting an object between the first and second extended legs of a yoke, comprising:
    a. a first hub secured to the end of said first leg and in facing relation to said object;
    b. a housing affixed to said first hub and having a spherically concave friction surface formed therein in facing relation to said object;
    c. a first shaft having a spherically convex friction surface at one end thereof in engagement with said spherically concave friction surface and extending toward said object, said shaft also having a keyway on the other end thereof and a flat surface area on the opposite side of said first shaft from said keyway;
    d. a first annular spherical bearing having spherically curved bearing surfaces and being supported by said first hub and radially surrounding a portion of said first shaft so as to support said first shaft;
    e. means for attaching one side of said object to the other end of said first shaft;
    f. a second hub secured to the end of said second leg and in facing relation to said object;
    g. a second annular spherical bearing having spherically curved bearing surfaces mounted in and supported by said second hub;
    h. a second shaft supported by said second annular bearing and extending toward said object; and,
    i. means for attaching the other side of said object to the other end of said second shaft.

2. Apparatus of claim 1 in which said housing comprises:
    a. a cylindrical cavity formed in said housing and facing said object; and,
    b. a spherical washer disposed within said cavity, said spherical washer having said spherically concave friction surface on the side thereof facing said object and a flat opposite surface in engagement with the end of said housing facing said cavity.

3. Apparatus of claim 2 further comprising a spring means disposed between the flat opposite surface of said spherical washer and the bottom of said cavity facing said object for creating a force urging said spherically concave and said spherically convex friction surfaces together.

4. Apparatus of claim 3 in which said housing further comprises:
    a. a threaded axial bore through the end of said housing adjacent said cavity;
    b. a threaded adjusting screw threaded into said threaded bore; and,
    c. a face plate attached perpendicularly to the end of said adjusting screw facing said object, such that said spring means are disposed between said face plate and the flat surface of said spherically concave washer, and such that the axial displacement of said adjusting screw toward said object creates a greater frictional force between said spherically concave and convex friction surfaces.

5. Apparatus of claim 4 in which said first shaft further comprises:
    a. a threaded stud on said one end of said first shaft; and,
    b. a nut threaded on said stud and having on one end thereof said spherically convex friction surface.

6. Apparatus of claim 5 in which said spherically concave friction surface and said spherically convex friction surface have the same radius of curvature.

7. Apparatus of claim 6 further comprising:
    a. a shoulder on said one end of said first shaft and adjacent said first spherical bearing and sufficient to engage the inner race thereof; and,
    b. a shoulder on said first hub sufficient to engage the outer race of said first spherical bearing on the opposite side thereof from said shoulder on said first shaft, such that said first spherical bearing is retained along the axis of said first shaft by means of the shoulder on said first shaft and the shoulder on said first hub.

8. Apparatus of claim 7 further comprising a first mounting bracket mounted on one side of said object and including a key adapted to engage said keyway and a facing adjustable securing screw adapted to retainingly engage said flat surface of said first shaft.

9. Apparatus of claim 8 in which said second shaft further comprises:
   a. a shoulder on one end thereof adjacent to said second spherical bearing and sufficient to engage the inner race thereof; and
   b. a shoulder on said hub sufficient to engage the outer race of said spherical bearing on the opposite side thereof from said shoulder on said shaft such that said spherical bearing is retained along the axis of said shaft by said shoulder on said shaft and said shoulder on said hub.

10. Apparatus of claim 9 in which said second shaft further comprises a keyway on the other end thereof and a flat recessed surface on the opposite side of said second shaft form said keyway.

11. Apparatus of claim 10 further comprising a second mounting bracket mounted on the other side of said object and including a key adapted to engage said keyway on said second shaft and a facing adjustable securing screw adapted to engage said flat recessed surface of said second shaft.

12. Apparatus for pivotally adjustably supporting an object between the first and second extended legs of a yoke comprising:
   a. a first hub secured to the end of said first leg and in facing relation to said object;
   b. a housing affixed to said first hub, said housing comprising:
      (1) an open-ended cylindrical cavity formed in said housing and facing said object;
      (2) a spherical washer disposed within said cavity, said spherical washer having a spherically concave friction surface on the side thereof facing said object and a flat opposite surface facing the end of said housing facing said cavity;
      (3) a threaded axial bore through the end of said housing adjacent said closed end of said cavity;
      (4) a threaded adjusting screw threaded into said threaded bore;
      (5) a face plate attached perpendicularly to the end of said adjusting screw facing said object;
      (6) spring means disposed between said face plate and the flat opposite surface of said spherical washer so as to urge said spherical washer toward said object and so that the axial displacement of said adjusting screw toward said object creates a greater force urging said spherical washer toward said object;
   c. a first shaft having on one end thereof a threaded stud and having on the other end thereof a keyway and a flat surface area on the opposite side of said first shaft from said keyway;
   d. a nut threaded on said stud and having on one end thereof a spherically convex friction surface in engagement with and of the same radius of curvature as said spherically concave friction surface;
   e. a first annular spherical bearing having spherically curved bearing surfaces and being supported by said first hub and radially surrounding a portion of said shaft so as to support said first shaft;
   f. a shoulder on said one end of said first shaft and adjacent said first spherical bearing and sufficient to engage the inner race thereof;
   g. a shoulder on said first hub sufficient to engage the outer race of said first spherical bearing on the opposite side thereof from said shoulder on said first shaft, such that said first spherical bearing is retained along the axis of said first shaft by means of the shoulder on said first shaft and the shoulder on said first hub;
   h. means for attaching one side of said object to the other end of said first shaft;
   i. a second hub secured to the end of said second leg and in facing relation to said object;
   j. a second annular spherical bearing having spherically curved bearing surfaces mounted in and supported by said second hub;
   k. a second shaft supported by said second annular bearing and extending toward said object; and,
   l. means for attaching the other side of said object to the other end of said second shaft.

13. Apparatus of claim 3 further comprising a first mounting bracket mounted on one side of said object and including a key adapted to engage said keyway and a facing adjustable securing screw adapted to retainingly engage said flat surface of said first shaft.

14. Apparatus of claim 13 in which said second shaft further comprises:
   a. a shoulder on one end thereof adjacent to said second spherical bearing and sufficient to engage the inner race thereof; and,
   b. a shoulder on said hub sufficient to engage the outer race of said spherical bearing on the opposite side thereof from said shoulder on said shaft such that said spherical bearing is retained along the axis of said shaft by said shoulder on said shaft and said shoulder on said hub.

15. Apparatus of claim 14 in which said second shaft further comprises a keyway on the other end thereof and a flat recessed surface on the opposite side of said second shaft from said keyway.

16. Apparatus of claim 15 further comprising a second mounting bracket mounted on the other side of said object and including a key adapted to engage said keyway on said second shaft and a facing adjustable securing screw adapted to engage said flat recessed surface of said second shaft.

* * * * *